UNITED STATES PATENT OFFICE.

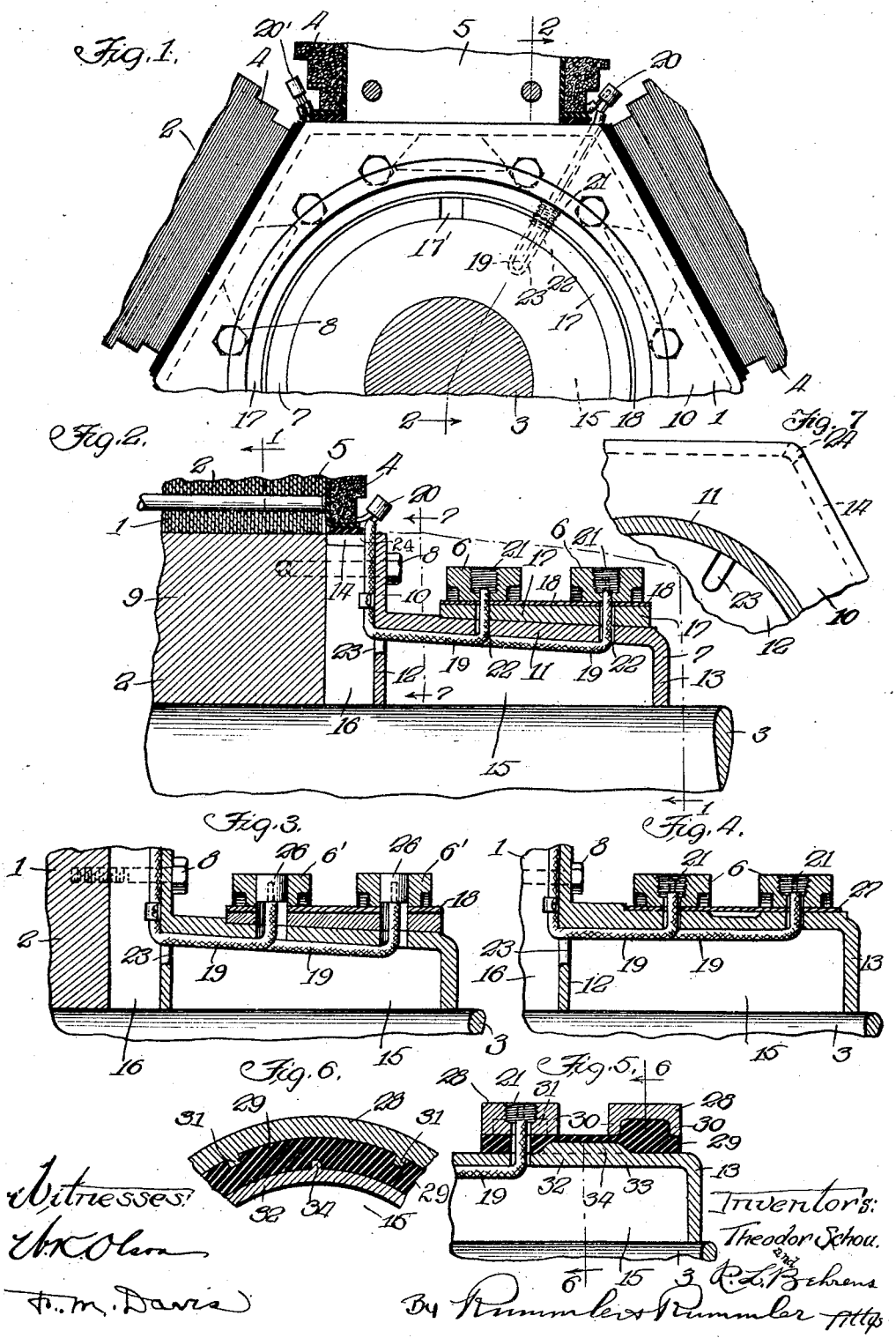

THEODOR SCHOU AND RICHARD L. BEHRENS, OF MANSFIELD, OHIO, ASSIGNORS TO THE IDEAL ELECTRIC & MANUFACTURING CO., OF MANSFIELD, OHIO, A CORPORATION OF OHIO.

COLLECTOR-RING SUPPORT.

1,378,564.     Specification of Letters Patent.     Patented May 17, 1921.

Application filed July 14, 1920. Serial No. 396,083.

*To all whom it may concern:*

Be it known that we, THEODOR SCHOU, a subject of the King of Norway, and RICHARD L. BEHRENS, a citizen of the United States of America, and residents of Mansfield, county of Richland, and State of Ohio, have invented certain new and useful Improvements in Collector-Ring Supports, of which the following is a specification.

This invention relates to collector ring apparatus, and especially to rotors, such for example, as rotary field members and rotary alternator armatures.

The main objects of this invention are to simplify the construction and arrangement of the collector ring and connection features; to furnish a more secure and dependable form of support and housing for the collector ring leads; to provide an improved form of field follower ring; to provide a form of construction not requiring as many parts or as much machining as usual in such devices; and to provide approximately a universal ring attachment adapted for many different sizes of machines or shafts, merely by selecting an appropriate size of shaft bore for the field follower casting, as will be more fully explained.

An illustrative embodiment of this invention is shown in the accompanying drawings in which—

Figure 1 is mainly an end view of the rotor, part being in section on line 1—1 of Fig. 2.

Fig. 2 is an axial section at 2—2 on Fig. 1.

Fig. 3 is a section mainly similar to Fig. 2 but showing a modified form of lead connection at the rings.

Fig. 4 is also similar to Fig. 2, except that the shrink ring style is shown instead of the tapered wedging style.

Fig. 5 shows the use of a molded setting for the collector rings instead of a plain insulating ring.

Fig. 6 is a fragmentary section on the irregular line 6—6 of Fig. 5.

Fig. 7 is a fragmentary section of the follower ring or collector hub at the line 7—7 of Fig. 2.

The rotor 1 here shown comprises a field member 2 keyed to the shaft 3, exciting coils 4 for the laminated pole pieces 5, collector rings 6 for supplying current to said coils, and a novel chambered member 7 in the form of a combined field core follower, coil seat, collector ring support and housing for the collector ring leads. Said member 7 as a whole may be designated generally as the field follower ring. It is secured to the field core by means of bolts 8 screwed into the field hub casting 9 and the heads of said bolts seat against the flange 10 of said ring.

The said member 7 includes a tapered hollow body part 11 and the end flanges 10, 12 and 13. Flange 10 is disposed radially outward at the large inner end of the part 11, and the flanges 12 and 13 are disposed inwardly at the inner and outer ends respectively to bear upon the shaft 3. The flange 10 is provided with a rim 14, the inner edge of which bears against the field hub 9. This construction provides a chamber 15 between the shaft 3 and the part 11 and another chamber 16 between the shaft and rim 14 adjacent to the hub 9. The outer edge of flange 10 is hexagonal to correspond with the number of poles here shown, and the rim 14 and chamber 16 are of corresponding shape.

The collector rings are supported on a wedging member 17 in the form of a split sleeve open at 17' and having a cylindrical outer face and a conical inner face to fit upon the corresponding outer face of the body part 11 of follower 7, a layer of insulation 18 being disposed beneath the rings.

Each ring 6 is provided with a current lead 19 extending to a corresponding terminal of the field windings, as shown at 20. Each lead 19 is connected to its ring 6 by means of a screw plug 21, 21 to which it is secured. Each of said leads extends from its ring inwardly through a perforation 22 in the insulation 18, taper sleeve 17 and follower body 11. Thence it extends backward within the housing chamber 15, through perforation 23 in flange 12 and thence radially outward within the housing chamber 16 to and through aperture 24 in rim 14, and to its terminal connection to the field windings 4, as at 20.

The collector ring hub 7 is adapted for machinery of different sizes depending on the axial bore in the parts 12 and 13 for the shaft 3.

The method of assembling the device is as follows: The lead housing collector ring support 7 and parts carried thereby is pressed into place on the shaft against the field hub 9 and secured by the bolts 8. Prior to applying the part 7 to the shaft the collector rings 6 are placed over the insulation 18 on the split sleeve 17, and these parts as one unit are forced into place on the lead housing collector ring support 7, the member 17 serving to secure a tight fit. The perforations 22 are then made through the collector rings 6, insulation 18, and the member 7. The holes through the collector rings 6 are tapped to secure in place the screw plugs 21. The leads 19 are soldered to said plugs and then threaded through the perforations 22 into the chamber 15, and the plugs screwed in tightly and so as to clear the brush bearing surface of the rings. The leads are then carried through the chambers 15 and 16 and apertures 23 and 24, and after the lead housing collector ring support 7 has been pressed into place against the field hub 9, the connection is made at 20.

In the construction shown in Fig. 3 plain threadless plugs 26 are driven into the rings 6′ in place of using screw plugs 21.

Referring to the form shown in Fig. 4, the effective bearing face of the slip ring support is cylindrical and the rings 6 are shrunk while hot directly thereon, except for a cylindrical layer of insulation 27.

Figs. 5 and 6 show an embodiment in which the rings 28 are mounted on a layer of hard setting plastic material or molded insulating compound 29 disposed on the special support therefor. Each ring is formed with inward flanges 30 and a series of cross webs 31. The body part 32 of keyed support 33 is provided with longitudinal fins 34 outstanding midway of the space between ring centers.

Although several embodiments of this invention are herein shown and described, it is to be understood that some of the details of the constructions shown may be altered or omitted without departing from the spirit of this invention as defined by the following claims:

We claim:

1. In a dynamo-electric machine having collector rings, a collector ring support comprising an annular frame including a nearly cylindrical body part with end flanges thereon disposed inwardly to bear on the shaft and an outwardly disposed flange at its inner end, the last-mentioned flange being provided with a rim disposed toward the core of the machine whereby a housing is provided for the collector ring leads.

2. A rotor comprising a shaft, a field core fixed thereon, field windings on said core, collector rings and field leads for supplying current to said windings, and a chambered support for the collector rings adapted to house said leads, said support including a tubular body part with inwardly disposed end flanges bored to fit said shaft, and said body part and the inner flange being apertured to admit said leads.

3. In a device of the character described, a shaft, a chambered circular frame thereon, collector rings mounted on said frame, leads extending inward from said rings into the chamber of said frame and wedging means disposed between said frame and rings for centering and setting the latter.

4. In a device of the character described, a shaft, a chambered circular frame thereon, collector rings insulated from and mounted on a cylindrical split sleeve with a tapered bore to be wedged over a conical seat on the chambered circular frame.

Signed at Mansfield, Ohio, this 3rd day of July 1920.

THEODOR SCHOU.
RICHARD L. BEHRENS.